(12) United States Patent
Kacevas

(10) Patent No.: US 7,047,400 B2
(45) Date of Patent: *May 16, 2006

(54) SINGLE ARRAY BANKED BRANCH TARGET BUFFER

(75) Inventor: Nicolas I. Kacevas, Haifa (IL)

(73) Assignee: Intel Corporation, Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 10/849,296

(22) Filed: May 20, 2004

(65) Prior Publication Data

US 2004/0215943 A1   Oct. 28, 2004

Related U.S. Application Data

(63) Continuation of application No. 09/471,202, filed on Dec. 23, 1999, now Pat. No. 6,757,815.

(51) Int. Cl.
   *G06F 15/00* (2006.01)

(52) U.S. Cl. ........................... 712/238; 712/239

(58) Field of Classification Search ........ 712/237–240, 712/202; 711/3, 128
   See application file for complete search history.

(56) References Cited

U.S. PATENT DOCUMENTS

| | | | | |
|---|---|---|---|---|
| 5,056,002 A | * | 10/1991 | Watanabe | 711/119 |
| 5,446,850 A | * | 8/1995 | Jeremiah et al. | 712/215 |
| 5,740,415 A | * | 4/1998 | Hara | 712/238 |
| 5,802,602 A | * | 9/1998 | Rahman et al. | 365/49 |
| 5,835,948 A | * | 11/1998 | Olarig et al. | 711/128 |
| 5,842,008 A | * | 11/1998 | Gochman et al. | 712/240 |
| 6,065,091 A | * | 5/2000 | Green | 365/49 |
| 6,304,960 B1 | * | 10/2001 | Yeh et al. | 712/236 |
| 6,385,696 B1 | * | 5/2002 | Doweck | 711/128 |

* cited by examiner

*Primary Examiner*—William M. Treat
*Assistant Examiner*—Tonia L. Meonske
(74) *Attorney, Agent, or Firm*—Kenyon & Kenyon LLP

(57) ABSTRACT

An Instruction Pointer (IP) signal is received comprising an IP tag field and an IP set field. A plurality of entries corresponding to the IP set field are read, each of the entries comprising an entry tag, an entry bank, and entry data. Each entry tag and entry bank is then compared with the IP tag and each of the plurality of banks. In one embodiment, the IP tag is concatenated with a number representing one of the plurality of banks and compared to the entry tag and entry bank. Separate comparisons may then be performed for each of the other banks.

34 Claims, 5 Drawing Sheets

PRIOR ART

SINGLE ARRAY BANKED BRANCH TARGET BUFFER

CROSS REFERENCE TO RELATED APPLICATIONS

This application is a continuation application that claims priority to U.S. application Ser. No. 09/471,202 (filed Dec. 23, 1999) now U.S. Pat. No. 6,757,815, the entire contents of which are incorporated herein.

BACKGROUND

The present invention relates to processors. More particularly, the present invention relates to a single array banked branch target buffer for use in a processor.

Many processors such as a microprocessor found in a computer, use an instruction pipeline to speed the processing of an instruction stream. The pipeline has multiple stages and an instruction is processed using early pipeline stages before a previous instruction is executed by later stages. Some instructions, such as a "conditional branch" instruction, however, must be executed before the processor can determine which instruction should be processed next. To increase efficiency, the processor "predicts" when a conditional branch is being processed and also predicts which instruction, or "branch," should be placed into the early pipeline stages before that conditional branch instruction is executed.

To predict branch instructions within the instruction stream, a cache called a "branch target buffer" can be used to store information about branch instructions previously executed by the processor.

An instruction fetch unit may fetch upcoming instructions by fetching several bytes at the same time, such as by fetching sixteen-byte blocks of memory. A single block, however, may contain multiple branch instructions. In such a processor, the branch prediction mechanism must find the first taken branch instruction, if any, within the current sixteen-byte block to determine the next sixteen-byte block to fetch.

To efficiently find the first taken branch instruction, a "banked" branch target buffer may be used. U.S. Pat. No. 5,842,008 entitled "Method and Apparatus for Implementing a Branch Target Buffer Cache with Multiple BTB Banks" discloses such a banked branch target buffer. Each bank in the branch target buffer contains branch entries for branch instructions located in a different subset of the memory blocks. The branch target buffer banks are ordered such that when a branch prediction must be made, the branch entry "hits" produced by each branch target buffer bank are ordered, reducing the amount of time required to prioritize the branch instructions.

The banked branch target buffer uses a different, independent array for each bank, such that each array provides information about branches residing in the associated bank. The information is later prioritized. By way of example, a branch target buffer can use four banks to store information about a sixteen byte cache line. The branch target buffer may store information about a single branch in each bank, and therefore a maximum of four branches would be stored for each sixteen byte cache line.

FIG. 1 illustrates a known architecture for a single bank in such a banked branch target buffer. In other words, a branch target buffer having four banks would need four of the circuits shown in FIG. 1 (one for each bank). For each bank, a lookup IP (Instruction Pointer) signal passes through a multiplexer 100 coupled to four buffer entries 200, or "ways." Note that the number of ways (four) does not have to be the same as the number of banks in the branch target buffer. The buffer entries 200 are mapped to cache data buffers 300, and each buffer entry 200 is coupled to a comparator 400. The lookup IP signal is also input to the comparators 400, and the results from each comparator 400 are coupled to another multiplexer 500 that selects cache data stored in the cache data buffers 300.

Each bank of the branch target buffer is addressed by the sixteen-byte line address. When a lookup to the branch target buffer occurs, each bank is addressed simultaneously and provides information for that particular bank and line. The result of each bank's search is then combined by a prioritizing and merging logic unit to produce the final branch target buffer prediction.

Assuming that each bank is organized in a classic four-way set associative fashion, a method for performing a look-up is illustrated in FIG. 2 for one of the four branch target buffer banks. The lookup address, or Instruction Pointer (IP) is split into an "IP tag" field and an "IP set" field at step 10. The IP set field corresponds to a specific bank in the branch target buffer. At step 20, the IP set field is decoded and used to read out the four ways corresponding to that set (i.e., the four entries in the specific branch target buffer bank). The tag, valid and data fields are then read for each of the four ways or entries at step 30. These four entry tags are compared to the IP tag in order to determine from which valid way, if any, there is a match at step 40, and the chosen way is then used to select the data that represents that particular bank's information.

In a traditional four-way set associative organization (such as the one shown in FIG. 1), it is forbidden to have the same valid tag in different ways of the same set. In other words, the match signals from the comparators and valid bit combined are mutually exclusive.

Providing independent arrays for each bank, however, creates routing problems, and increases area and design overhead related to the banked branch target buffer implementation. In particular, the use of multiple arrays implies costly routing from each array to the merging logic, which translates directly into timing problems.

Moreover, the utilization of the available entries is limited when multiple arrays are used. For example, branches may not be uniformly distributed between the banks. Suppose that most branches sit in bank 0. In this case, there may be a lot of replacements in bank 0 while entries in banks 1 to 3 are less utilized.

SUMMARY

In accordance with an embodiment of the present invention, an Instruction Pointer (IP) signal is received comprising an IP tag field and an IP set field. A plurality of entries corresponding to the IP set field are read, each of the entries comprising an entry tag, an entry bank, and entry data. Each entry tag and entry bank is then compared with the IP tag and each of the plurality of banks.

DETAILED DESCRIPTION

Figure 1:
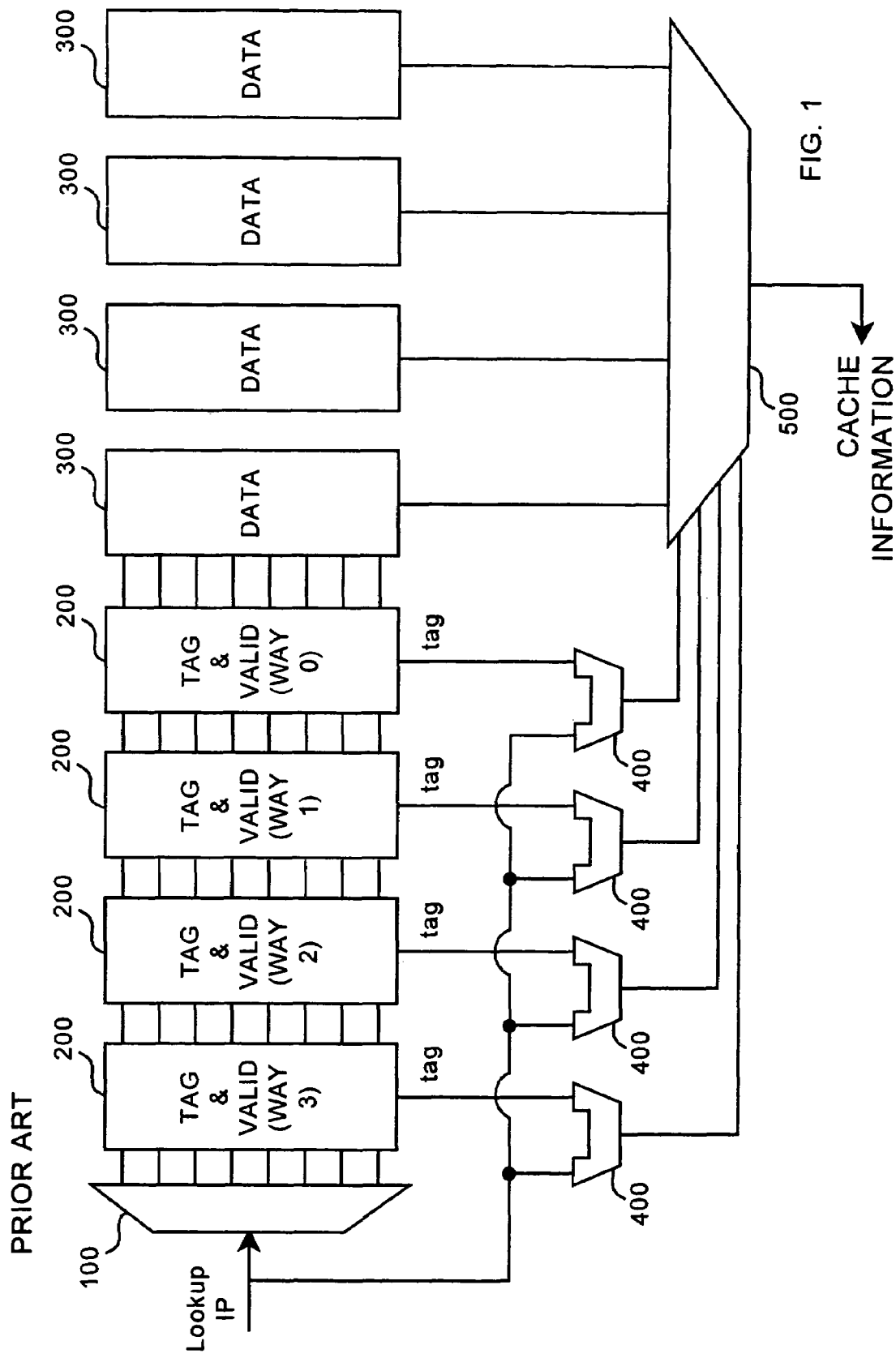
FIG. 1 illustrates a known architecture for a single bank in a banked branch target buffer.
Figure 2:
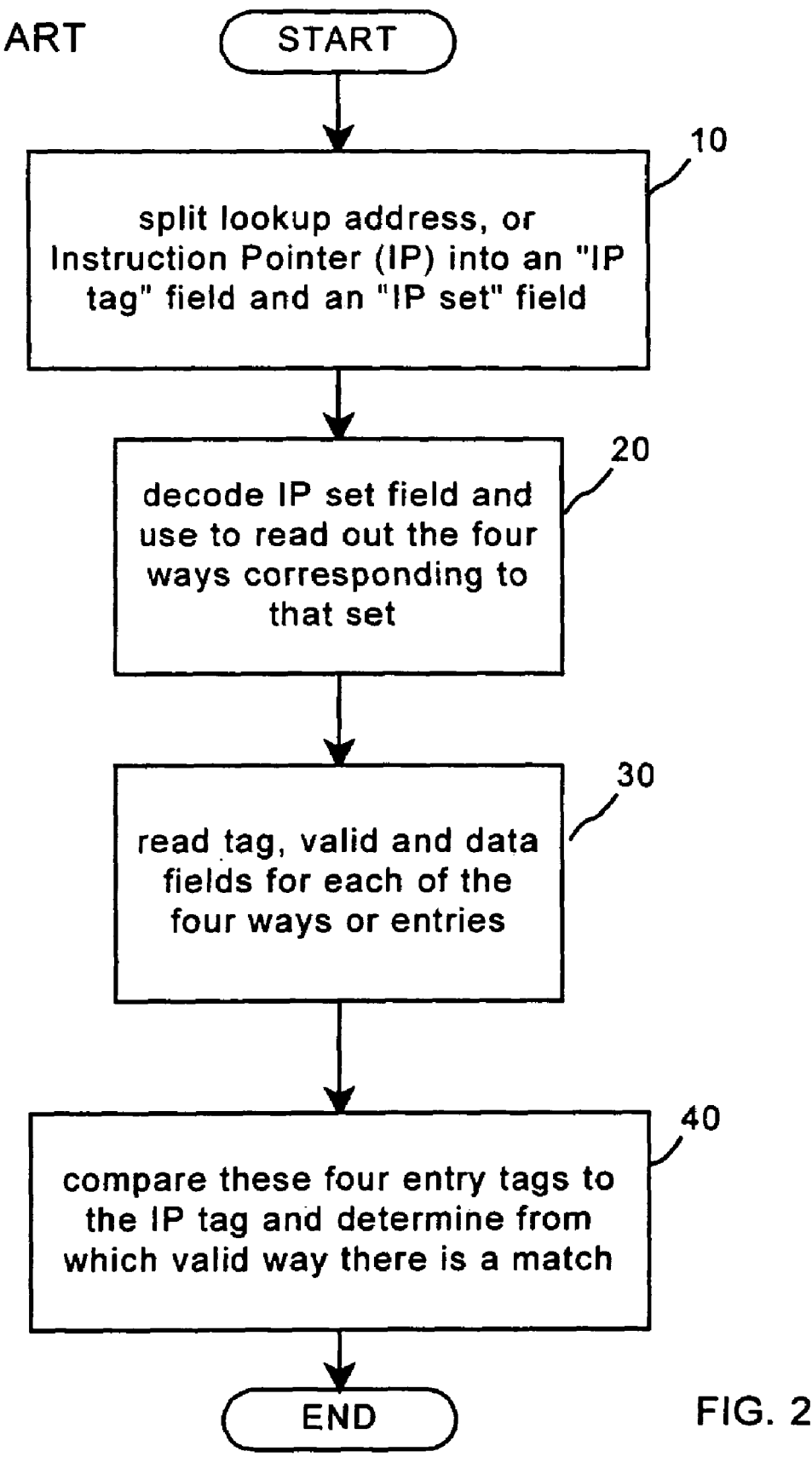
FIG. 2 is a flow diagram of a known method for performing a look-up using a banked branch target buffer.
Figure 3:
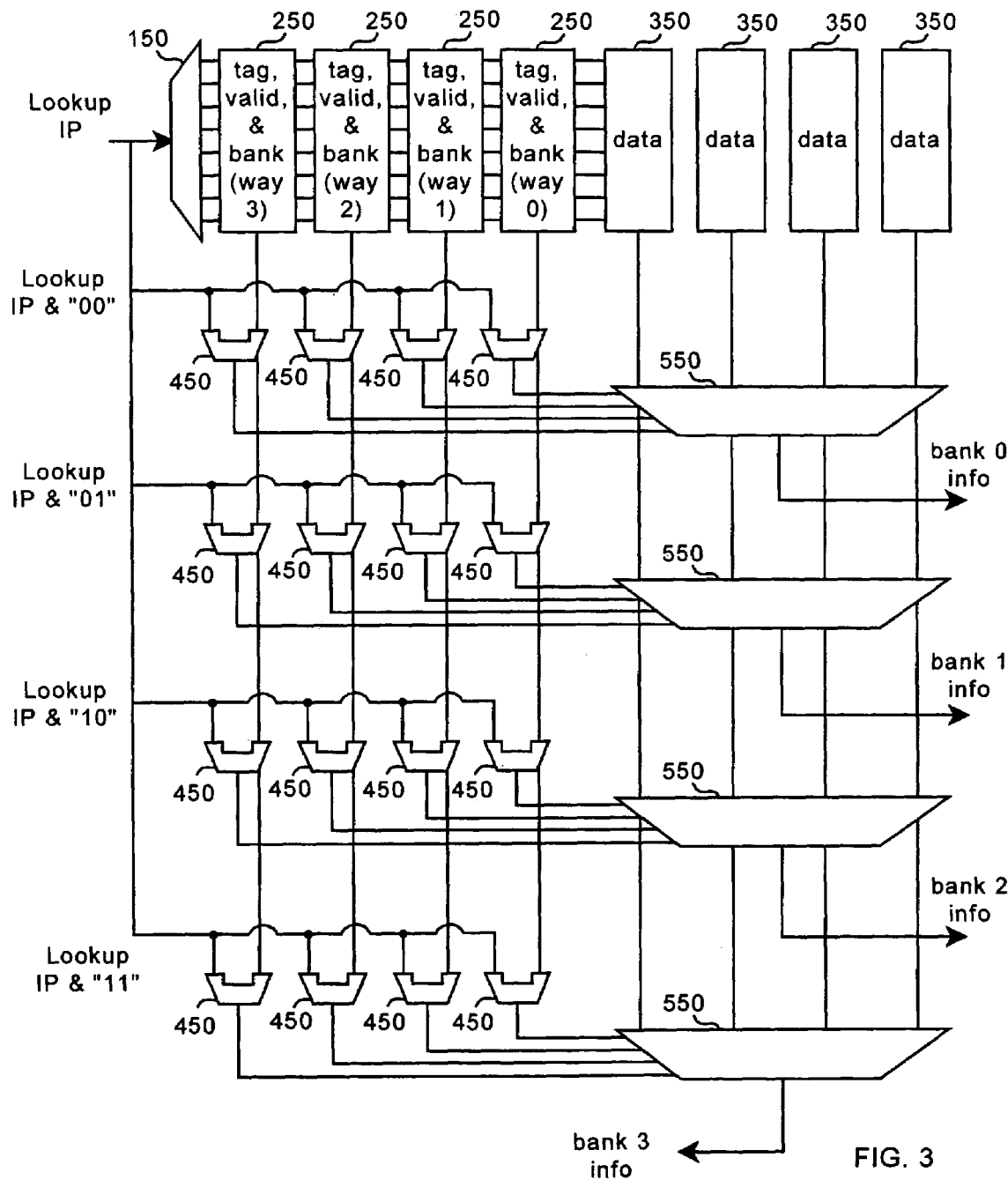
FIG. 3 is a banked branch target buffer according to an embodiment of the present invention.

An embodiment of the present invention is directed to a single array banked branch target buffer. Referring now in detail to the drawings wherein like parts are designated by like reference numerals throughout, FIG. 3 illustrates a four-bank branch target buffer according to an embodiment of the present invention. A lookup IP signal passes through a multiplexer 150 coupled to four buffer entries 250, or "ways." Note that the number of ways (four) does not have to be the same as the number of banks in the branch target buffer. The buffer entries 250 are mapped to cache data buffers 350, and each buffer entry 250 is coupled to four comparators 450. The lookup IP signal is also input to the comparators 450 together with a hard-wired bank number (i.e., "00," "01," "10" and "11"), and the results from each comparator 450 are coupled to multiplexers 550 that select cache data stored in the cache data buffers 350. As a result, information for four banks is selected.

Thus, a banked branch target buffer is provided having a single array, as opposed to having an array for every bank. The array has an extra field, next to the tag, which specifies which bank an entry belongs to. Note that—by way of example only—the unique array can be four-way set associative, although the number of ways is not related to the number of banks. It will also be understood by those skilled in the art that a number of banks other than four banks may be used instead.

Figure 4:
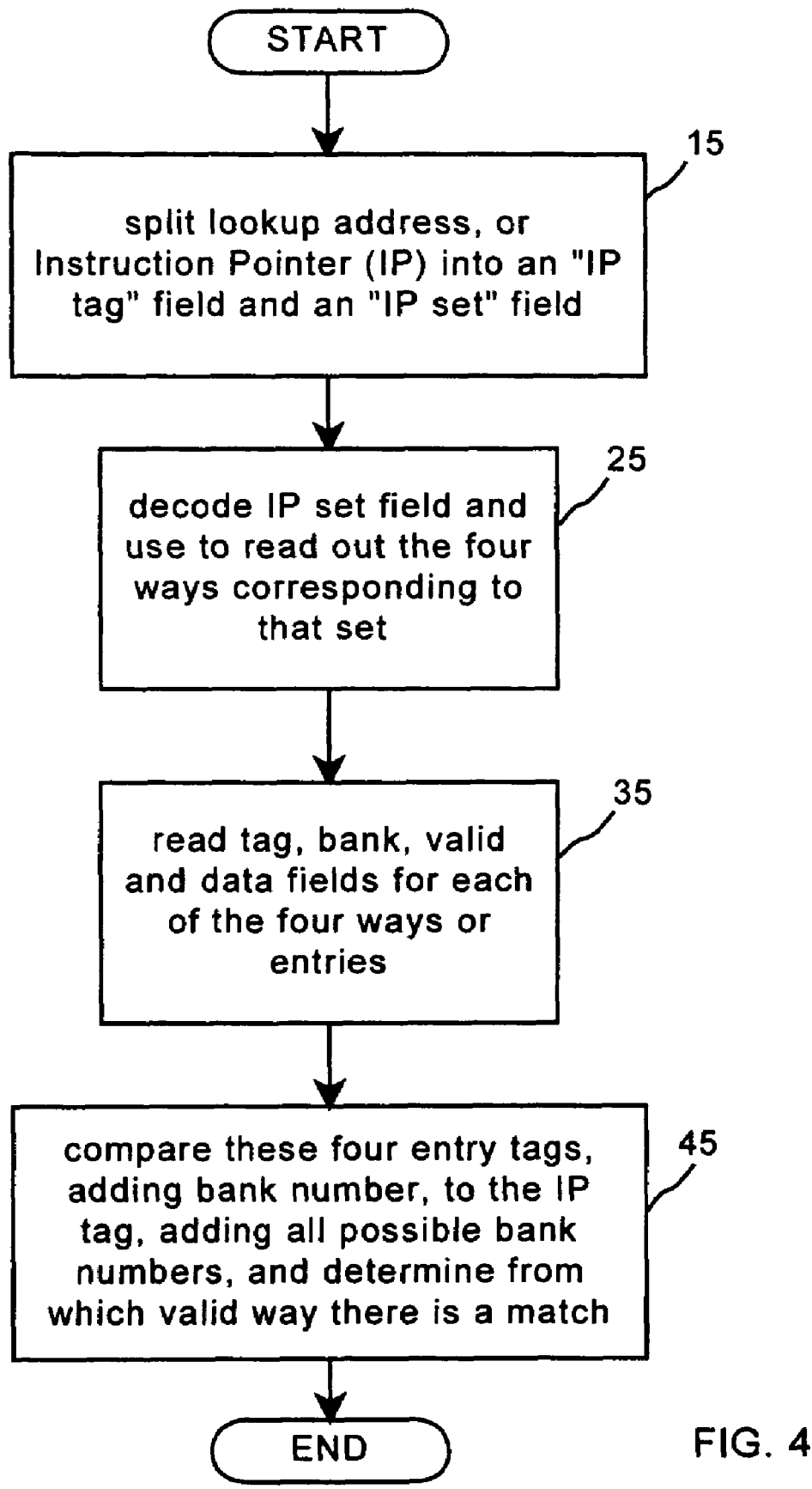
FIG. 4 is a flow diagram of a method for using a banked branch target buffer according to an embodiment of the present invention.

FIG. 4 is a flow diagram of a method for using a banked branch target buffer according to an embodiment of the present invention. At step 15, the lookup address, or Instruction Pointer (IP) is split into an "IP tag" field and an "IP set" field. The IP set field is decoded and used to read out the four ways (entries) corresponding to that set (bank) at step 25. The tag, valid and data fields are then read for each of the four ways at step 35.

The four entry tags concatenated with the bank number are then compared to the IP tag, concatenated also with all the possible bank numbers, at step 45. This means that for every possible bank number there is a set of four (i.e., the number of ways) comparisons. In the example shown in FIG. 3, there are four banks and four ways, so the total number of comparisons is 16. Each of the sets of four comparators provide four results, whose meaning is that there is a match for that bank and for that particular way.

Each chosen way for a bank set of comparators is then used to select the particular bank's information. In this way, up to four banks of branch target buffer information may be obtained from a single branch target buffer array.

According to an embodiment of the present-invention, the valid tag and bank in different ways of the same set may be unique. In other words, the match signals from the same bank's comparators and valid bit combined should be mutually exclusive.

Note that although from a logic point of view it seems that there is a lot of overhead by having four sets of four comparators, in practice most of the logic of the comparators for a given way can be shared. This is because the compared values are almost identical. The different bits are constants from one of the sources, which may enable further optimizations.

Figure 5:
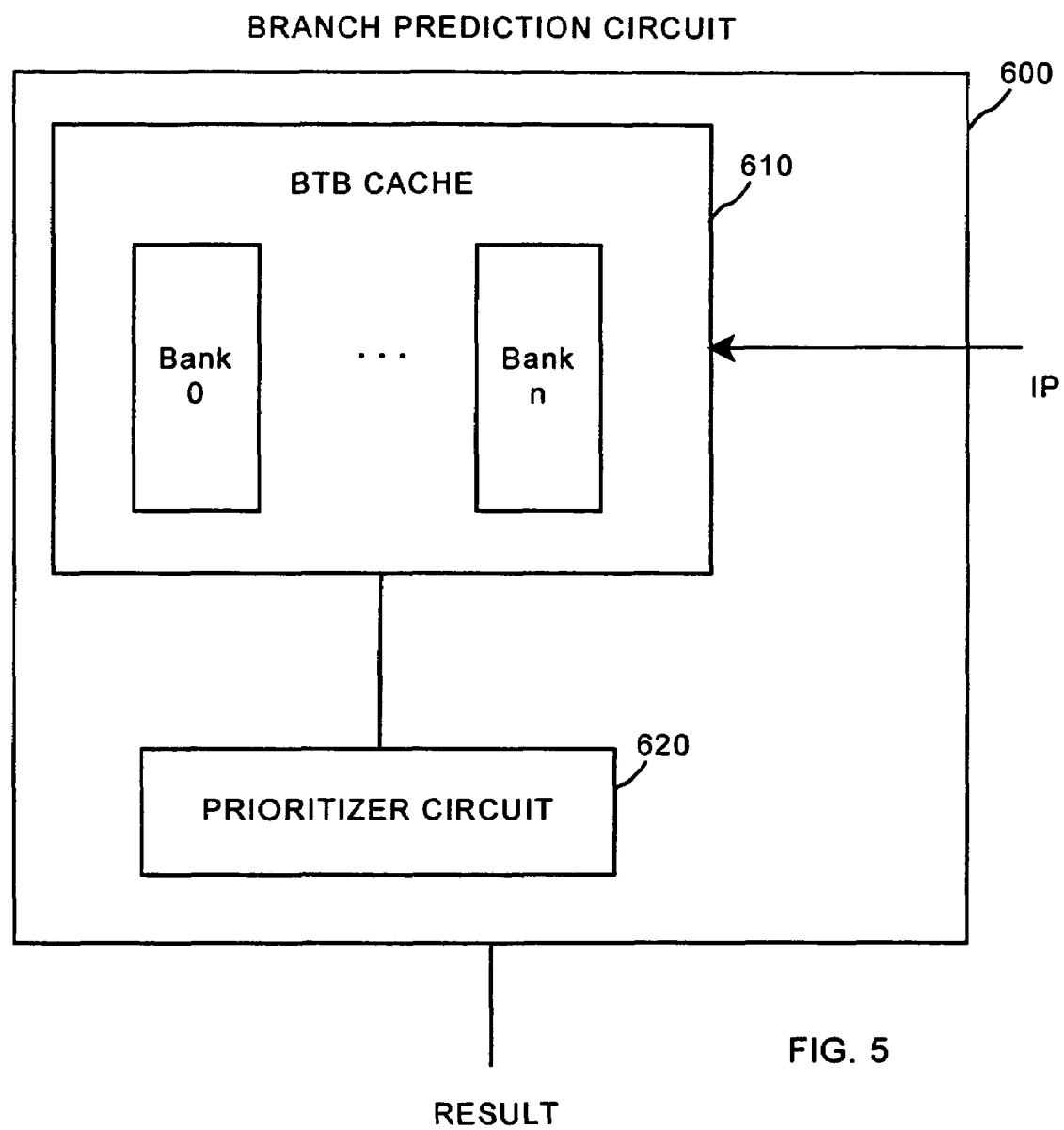
FIG. 5 is a branch prediction circuit according to an embodiment of the present invention.

FIG. 5 is a branch prediction circuit 600 according to an embodiment of the present invention. The Instruction Pointer (IP) is received by a branch target buffer (BTB) cache 610 that has a number (n) of banks arranged as a single array. A prioritizer circuit 620 uses information from the BTB cache 610 to determine a result.

The branch prediction circuit 600 may be used, for example, in a computer processor coupled to a memory, the memory being memory divided into memory blocks. In this case, the branch prediction circuit 600 would predict a block of memory to fetch based upon the IP (that points to a currently executing instruction). The BTB cache 610 shown in FIG. 5 comprises a plurality of ordered branch target buffer banks (formed as a single array), comprising a plurality of branch entries storing information about branch instructions addressed by address bits specifying a different subblock within said memory blocks. The branch prediction circuit 600 receives IP and indexes into all of the ordered branch target buffer banks of the BTB cache and fetches at most one branch entry from each bank. The prioritizer circuit 620 indicates the selection of one of the branch entries fetched by the branch prediction circuit 600 from the ordered branch target buffer banks by selecting a first taken branch instruction located after the IP.

Providing a single array for all of the banks reduces routing problems as well as area and design overhead. Moreover, the utilization of the available entries is improved even when branches are not uniformly distributed between the banks. Suppose that most branches sit in bank 0. In this case, there will merely be more instances of bank 0 throughout the array.

Although various embodiments are specifically illustrated and described herein, it will be appreciated that modifications and variations of the present invention are covered by the above teachings and within the purview of the appended claims without departing from the spirit and intended scope of the invention. Moreover, the present invention applies to a broad range of banked branch target buffer architectures, and is therefore a general approach that includes a broad range of specific implementations. In addition, although software or hardware are described to control certain functions, such functions can be performed using either software, hardware or a combination of software and hardware, as is well known in the art. As is also known, software may be stored, such as in memory, in the form of instructions, including micro-code instructions, adapted to be executed by a processor. As used herein, the phrase "adapted to be executed by a processor" encompasses instructions that need to be translated before being executed by the processor.

What is claimed is:

1. A method, comprising:
   responsive to an instruction pointer (IP) signal, that includes an IP tag and an IP set;
   reading, from a plurality of ways, an entry tag, an entry bank number and entry data;
   concurrently comparing (i) each entry tag and entry bank number with (ii) the IP tag and an identifier of each of the plurality of banks, wherein each entry is a way and the number of banks is independent from the number of ways; and
   selecting data based on results of said comparing,
   wherein the comparing includes:
      concatenating (i) each entry tag and entry bank number;
      concatenating (ii) the IP tag and a number representing each of the plurality of banks; and comparing the concatenated entry tag and entry bank number with the concatenated IP tag and number representing each of the plurality of banks.

2. The method of claim 1, wherein each entry further comprises an entry valid field and said selecting is further based on the entry valid field.

3. The method of claim 1, wherein the plurality of banks in the branch target buffer are implemented in a single array.

4. The method of claim 1, wherein each entry further comprises an entry valid field and different entries do not have identical entry tag, entry bank number and entry valid values.

5. The method of claim 1, further comprising decoding the IP set.

6. The method of claim 1, wherein said selecting comprises selecting data to provide branch information related to a cache line to be read.

7. The method of claim 1, wherein each of the plurality of banks is organized in a set associative fashion.

8. A banked branch target buffer, comprising:
an input port to receive a look-up Instruction Pointer (IP) including an IP tag and an IP set, the IP set to identify a plurality of information entries including an entry tag, an entry bank number and entry data; and
a comparator coupled to said input port to concurrently compare (i) a concatenation of the IP tag and a bank identifier with (ii) a concatenation of the entry tag and entry bank number of each information entry, wherein each entry is a way and the number of banks is independent of the number of ways.

9. The banked branch target buffer of claim 8, wherein each entry further comprises an entry valid field and data is selected based on the entry valid field.

10. The banked branch target buffer of claim 8, wherein the branch target buffer has a plurality of banks implemented in a single array.

11. The banked branch target buffer of claim 10, wherein each of the plurality of banks is organized in a set associative fashion.

12. The banked branch target buffer of claim 8, wherein each entry further comprises an entry valid field and different entries do not have identical entry tag, entry bank number and entry valid values.

13. The banked branch target buffer of claim 8, wherein the IP set is decoded and used to read out the entries.

14. The banked branch target buffer of claim 8, wherein data is selected to provide branch information related to a cache line is to read.

15. A branch instruction prediction mechanism comprising:
a branch target buffer cache comprising a plurality of ordered branch target buffer banks formed as a single array, the array having a field to specify which bank an entry belongs to, each said ordered branch target buffer bank comprising a plurality of branch entries to store information about branch instructions addressed by address bits to specify a different subblock within said memory blocks;
a branch prediction circuit to receive said instruction pointer to index into all of said ordered branch target buffer banks of said branch target buffer cache, to concurrently compare (i) a concatenation of IP tags and an identifier of each of the plurality of ordered branch target buffer banks with (ii) a concatenation of entry tags and entry tag bank numbers, and to fetch at most one branch entry from each said plurality of branch target buffer banks based on said comparison; and
a prioritizer circuit to indicate the selection of one of said branch entries fetched by said branch prediction circuit from said ordered branch target buffer banks by selecting a first taken branch instruction located after said instruction pointer.

16. The branch instruction prediction mechanism of claim 15, wherein the branch prediction circuit is to predict a block of memory to fetch based on the instruction pointer that points to a currently executing instruction.

17. The branch instruction prediction mechanism of claim 16, wherein the branch instruction prediction mechanism is coupled to the block of memory.

18. The branch instruction prediction mechanism of claim 15, wherein the branch prediction circuit is to:
concatenate each entry tag with each entry bank number;
concatenate each IP tag with each identifier of each of the plurality of ordered branch target buffer banks; and
compare (i) the concatenated entry tags and entry bank numbers with (ii) the concatenated IP tags and identifiers of the plurality of ordered branch target buffer banks.

19. A method comprising:
receiving a current instruction pointer in a branch prediction mechanism, said branch prediction mechanism comprising a plurality of ordered branch target buffer banks formed as a single array, the array having a field to specify which bank an entry belongs to;
indexing into all of said plurality of ordered branch target buffer banks, each said branch target buffer bank comprising a plurality of branch entries to store information about branch instructions addressed by address bits to specify a different subblock within said memory blocks;
concurrently comparing (i) a concatenation of an IP tag of said instruction pointer and an identifier of each of the plurality of ordered branch target buffer banks with (ii) a concatenation of each entry tag and entry bank number of each one of said branch entries;
retrieving at most one ordered branch entry from each said ordered branch target buffer banks based on said comparison; and
selecting a next upcoming branch instruction from said retrieved ordered branch entries.

20. The method of claim 19, further comprising:
prior to the comparing,
concatenating the IP tag of said instruction pointer and the identifier of each of the plurality of ordered branch target buffer banks, and
concatenating each entry tag and entry bank number of each one of said branch entries.

21. The method of claim 19, further comprising:
predicting a subblock within the memory blocks to fetch based on the current instruction pointer that points to a currently executing instruction.

22. The method of claim 21, wherein the predicted subblock within the memory blocks includes the next upcoming branch instruction.

23. A method comprising:
receiving an Instruction Pointer (IP) signal, the instruction pointer signal including an IP tag and an IP set;
reading a plurality of entries corresponding to the IP set, each of the entries including an entry tag, an entry bank number, and entry data;
concatenating each entry tag with each corresponding entry bank number;
concatenating the IP tag with an identifier of each of the plurality of banks;

comparing the concatenated entry tags and corresponding entry bank numbers with the concatenated IP tag and identifiers; and selecting data based on results of said comparing.

24. The method of claim 23, wherein the identifiers are constants.

25. The method of claim 23, wherein the comparing includes concurrently comparing the concatenated entry tags and corresponding entry bank numbers with the concatenated IP tag and identifiers.

26. The method of claim 25, wherein the comparing includes sharing comparison logic to perform the concurrent comparing.

27. A cache, comprising:
an array of cache entries, the entries indexed by a set identifier and having outputs coupled to a plurality of output controllers, the array shared among a plurality of banks,
a plurality of bank indexing circuits, each bank indexing circuit comprising tag entries having fields for a tag identifier and a bank identifier corresponding to one of the plurality of banks, the tag entries indexed by a set identifier, and
a plurality of comparators, each comparator having a first input coupled to the tag entries and a second input coupled to an input identifier that includes an input tag identifier and a respective bank identifier corresponding to one of the plurality of banks, each comparator having an output coupled to a respective output controller.

28. The cache of claim 27, wherein each tag entry is a concatenation of the tag identifier and the bank identifier.

29. The cache of claim 28, wherein the input identifier is a concatenation of the input tag identifier and the respective bank identifier.

30. The cache of claim 29, wherein each comparator is to compare a respective concatenated tag entry with a respective concatenated input identifier.

31. The cache of claim 30, wherein the comparators are to perform the comparisons concurrently.

32. The cache of claim 27, further comprising:
a selector to select one of the outputs from the comparators, the selection being a next upcoming branch instruction.

33. A method, comprising:
concurrently comparing (a) a plurality of tag entries, each tag entry comprising a concatenation of a tag identifier and a bank identifier with (b) a plurality of input identifiers, each input identifier comprising a concatenation of an input tag identifier and a respective bank identifier;

associating the bank identifier with one of a plurality of banks; and sharing a single array of cache entries among the plurality of banks, each cache entry comprising branch instructions and each bank comprising a plurality of tag entries associated with corresponding cache entries.

34. The method of claim 33, further comprising:
selecting a cache entry based on the concurrent comparison to predict a next upcoming branch instruction.

* * * * *